G. Jennings,
Plow Fender.

No. 93,997.   Patented Aug. 24, 1869.

Witnesses:
Geo. W. Mabee
Jno. H. Brooks

Inventor:
Gregory Jennings
Per Munn & Co.
Attorneys.

UNITED STATES PATENT OFFICE.

GREGORY JENNINGS, OF WEST CAIRO, OHIO.

IMPROVEMENT IN SHOVEL-PLOWS.

Specification forming part of Letters Patent No. 93,997, dated August 24, 1869.

*To all whom it may concern:*

Be it known that I, GREGORY JENNINGS, of West Cairo, in the county of Allen and State of Ohio, have invented a new and useful Improvement in Shovel-Plows; and I do hereby declare that the following is a full, clear, and exact description thereof, which will enable others skilled in the art to make and use the same, reference being had to the accompanying drawings, forming part of this specification, in which—

Figure 1:
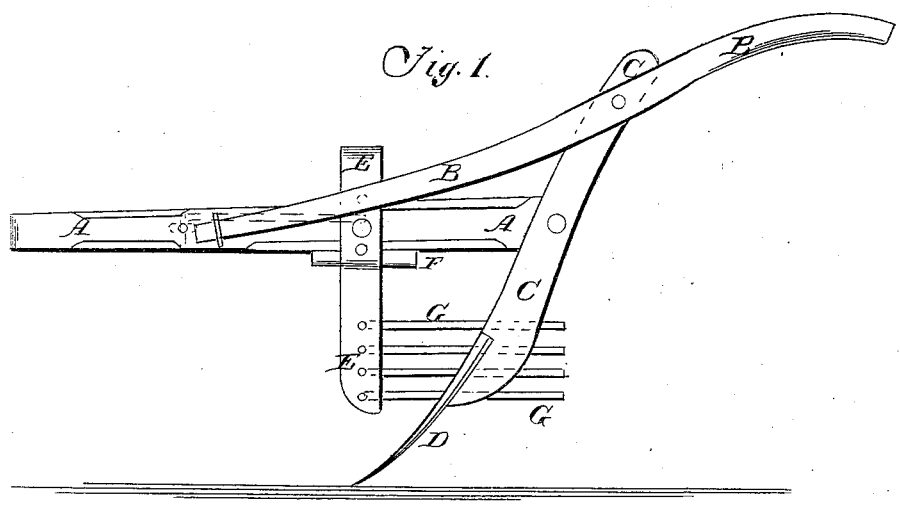
Figure 2:
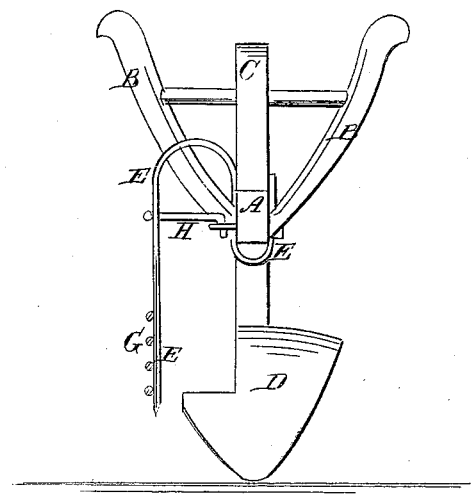

Figure 1 is a side view of a single-shovel plow to which my improvement has been attached. Fig. 2 is a front view of the same.

Similar letters of reference indicate corresponding parts.

My invention has for its object to improve the construction of the shovel-plow for which Letters Patent No. 81,173 were granted to Aaron Jennings August 18,1868, so as to make it more convenient and effective in use; and it consists in adjustably connecting the guard-fingers with the plow-beam by means of a curved bar of steel or other suitable metal, as hereinafter more fully described.

A represents the plow-beam, B are the handles, and C is the standard to the lower end of which the shovel is attached, about the construction of which parts there is nothing new.

D is the plow, the upper part of the side of which that is next the rows of plants may be cut off, as shown in Fig. 2, so that less dirt may be thrown in that direction.

E is a bar, made of steel or other suitable metal, the upper part of which is so bent as to pass beneath the beam A, as shown in Fig. 2. The bar E is secured to the beam A by a bolt which passes horizontally through the beam A, and through one or the other of the holes through the bar E, so that the said bar may be adjusted as desired.

F is a wedge, which is placed in the loop of the bar E, beneath the beam A, when the said bar is lowered, so as to form a space between the said loop and the said beam, as shown in Figs. 1 and 2. The other part of the bar is bent upward, outward, and downward, so as to descend at a proper distance from the plow D.

To the lower part of the arm E is attached a series of rearwardly-projecting arms or fingers, G, placed the one above the other, and at a suitable distance apart, to allow the fine dirt to pass through, but to keep back the clods, lumps, &c., that would injure the plants. The forward edge of the lower part of the bar E should be beveled off to enable it to more readily pass through grass, weeds, or other obstructions. The draft-strain upon the lower part of the guard-arm E may be supported by a bar, H, one end of which hooks into a hole in the bar E, and its other end into an eye or staple attached to the side of the beam A. This construction enables the guard arms or fingers to be raised or lowered according to the depth at which it is desired to have the plow D work in the ground. It should be observed that this improvement may be attached to single and double shovel plows with equal facility and advantage. If desired, the bar E, instead of passing beneath the beam A, may be clamped between two short iron bars, one or both of which may be notched, and at the same time secured to said beam by two bolts passing through the ends of the said bars and through the beam A. The notch is made a little longer than the breadth of the bar E, to more securely support the edge of said bar. This latter construction I prefer, as it enables the guard to be adjusted by simply loosening the nuts of the clamping-bolts.

Having thus described my invention, what I claim as new, and desire to secure by Letters Patent, is—

1. The bent or curved arm E, having guard-fingers G, attached to its lower part and adjustably connected with the beam A, substantially as herein shown and described, whether used with or without the draft-rod H, as and for the purpose set forth.

2. The combination of the recessed shovel D with the curved arm E, both constructed and operating together, as set forth.

GREGORY JENNINGS.

Witnesses:
ANTHONY HARFESTER,
AMBROSE S. SNIDER.